(12) United States Patent
Tachibana et al.

(10) Patent No.: US 7,261,201 B2
(45) Date of Patent: Aug. 28, 2007

(54) CHAIN-DRIVING MECHANISM AND CONVEYOR APPARATUS

(75) Inventors: Katsuyoshi Tachibana, Tokyo (JP); Seiji Kawamoto, Tokyo (JP)

(73) Assignee: Hirata Corporation, Tokyo (JP)

( * ) Notice: Subject to any disclaimer, the term of this patent is extended or adjusted under 35 U.S.C. 154(b) by 4 days.

(21) Appl. No.: 10/550,065

(22) PCT Filed: Mar. 8, 2004

(86) PCT No.: PCT/JP2004/002954

§ 371 (c)(1),
(2), (4) Date: Sep. 21, 2005

(87) PCT Pub. No.: WO2004/085291

PCT Pub. Date: Oct. 7, 2004

(65) Prior Publication Data

US 2006/0225992 A1  Oct. 12, 2006

(30) Foreign Application Priority Data

Mar. 27, 2003 (JP) ............................. 2003-086684

(51) Int. Cl.
*B65G 13/06* (2006.01)
(52) U.S. Cl. ..................................... 198/791
(58) Field of Classification Search ................ 198/791, 198/790

See application file for complete search history.

(56) References Cited

U.S. PATENT DOCUMENTS

| 4,193,493 A * | 3/1980 | Ekstrand ..................... 198/791 |
| 4,215,775 A * | 8/1980 | Gebhardt et al. ....... 198/781.07 |
| 4,225,037 A * | 9/1980 | Eberle .................... 198/341.07 |
| 4,325,474 A * | 4/1982 | Rae ........................ 198/781.02 |
| 4,993,541 A * | 2/1991 | Roh ....................... 198/781.02 |
| 6,460,690 B1 * | 10/2002 | Tachibana et al. .......... 198/791 |

FOREIGN PATENT DOCUMENTS

| JP | 5-82926 | 11/1993 |
| JP | 6-20329 | 3/1994 |
| JP | 6-135527 | 5/1994 |
| JP | 11-079349 | 3/1999 |

* cited by examiner

*Primary Examiner*—Mark A. Deuble
(74) *Attorney, Agent, or Firm*—Wenderoth, Lind & Ponack, L.L.P.

(57) ABSTRACT

A chain-driving mechanism and a conveyor apparatus of the present invention include a plurality of rollers (20) arranged to convey to-be-conveyed objects, a driving mechanism that drives the rollers (20) in conjunction with each other, and a motor (80) that exerts a driving force onto the driving mechanism. The driving mechanism includes a plurality of sprockets (40) that rotate coaxially with and together with the rollers (20), an endless chain (50) wound onto the sprockets (40), and a chain guide (60, 61, 62) disposed adjacent to the chain (50) so as to sandwich the chain (50) from the outside in the upward and downward directions. With this structure, there is no need to adjust the stretch of the chain, and the chain can be prevented from slipping off. Additionally, the structure can be made simpler, and costs can be made smaller.

11 Claims, 11 Drawing Sheets

CHAIN-DRIVING MECHANISM AND CONVEYOR APPARATUS

TECHNICAL FIELD

This invention relates to a chain-driving mechanism including a plurality of sprockets and a chain, and relates to a conveyor apparatus.

BACKGROUND ART

A conventional conveyor is known that includes a plurality of rollers arranged to convey objects to be conveyed, a plurality of sprockets each of which is provided so as to be coaxial with the roller and rotate together therewith, an endless chain wound onto these sprockets, another chain wound onto some of the sprockets and onto a driving sprocket of a driving source in order to provide a driving force, and a tension adjusting mechanism that automatically adjusts the tension of the chains.

In this apparatus, if an elongation occurs in the chains wound onto the sprockets, for example, because of a time-dependent change caused by a conveying operation, the chain wound onto the driving sprocket is adjusted to automatically absorb the elongation by means of the tension adjusting mechanism. On the other hand, there is a fear that the chain wound onto the other sprockets that rotate together with the rollers will be disengaged from the sprockets when looseness is caused in proportion to the elongation. Therefore, to remove this looseness, the conveyor is required to be regularly stopped and be adjusted (for example, see Japanese Published Unexamined Utility Model Application No. H5-82926).

However, the operation of the apparatus must be stopped for the adjusting work during which productivity is lowered, and the adjusting work is troublesome. On the other hand, if the tension adjusting mechanism is provided, the adjusting work becomes unnecessary, but the tension given to the chain will cause an increase in a driving load. Additionally, the tension adjusting mechanism is complex, and a space to dispose the mechanism is needed, and, furthermore, the tension adjusting mechanism leads to a rise in the cost of the apparatus.

The present invention has been made in consideration of the foregoing circumstances. It is therefore an object of the present invention to provide a chain-driving mechanism that has a simple structure, that is low in cost, that is not required to adjust an elongation even if such an elongation occurs in a chain, that can prevent a chain from slipping off from sprockets or from being positionally inaccurately engaged therewith, and that can reliably transmit a driving force, and to provide a conveyor apparatus using this chain drive mechanism.

SUMMARY OF THE INVENTION

The chain-driving mechanism of the present invention that achieves the object includes a plurality of sprockets disposed in series, an endless chain wound onto the sprockets in order to transmit a driving force given to at least one of the sprockets to the remaining sprockets and drive the remaining sprockets, and a chain guide disposed adjacent to the chain so as to sandwich the chain from the outside of the outer periphery thereof.

According to this structure, even if the chain is elongated resulting from a time-dependent change, the chain guide disposed adjacent to the outside of the chain restricts an inaccurate engagement of the chain (i.e., a shake or a slack in a direction perpendicular to the direction in which the chain is stretched), and prevents the chain from being disengaged from the sprockets. Therefore, since the chain is accurately engaged with each of the sprockets on both sides, i.e., on the tension and slack sides in particular, in a structure in which three or more sprockets are disposed, the chain is successively sent (pulled) by the sprockets, i.e., from the sprocket disposed at one end to the sprocket disposed at the other end through the sprockets disposed at the middle. Accordingly, the slack of the chain between the sprockets is absorbed, and a driving force is reliably transmitted.

As a result, there is no need to adjust the stretch of the chain, and the chain can be prevented from slipping off. Therefore, the structure can be made simpler, and costs can be made smaller than a case in which, for example, an adjusting mechanism for exclusive use is provided.

The chain drive mechanism formed as above can employ a structure in which the sprockets are disposed so as to rotate around an axial line extending substantially horizontally, and the chain guide is disposed so as to sandwich the chain from the outside in upward and downward directions.

According to this structure, even if the chain is elongated because of a time-dependent change and is loosened vertically downward in accordance with this elongation in a state in which the chain is wound onto the sprockets in a vertical plane, the chain guide disposed adjacent to the lower side of the chain and the chain guide disposed adjacent to the upper side of the chain restrict a downward slack of the chain and restrict an upward movement resulting from a shake in a direction perpendicular to the direction in which the chain is stretched, so that the chain can be prevented from being disengaged from the sprockets. As a result, on the upper and lower sides, i.e., on the tension and slack sides, the slack of the chain between the sprockets is absorbed, and the driving force is reliably transmitted in the same way as above.

The chain drive mechanism formed as above can employ a structure in which the chain guide is made of a softer material than the chain.

According to this structure, even if the chain slides on the chain guide in the state of having been elongated, the chain is constrained or prevented from wearing down, and hence a desired function can be guaranteed, and a transmitting operation can be stably provided.

The conveyor apparatus of the present invention that achieves the object includes a plurality of carriers arranged to convey objects to be conveyed, a driving mechanism that drives the carriers in conjunction with each other, and a driving source that exerts a driving force onto the driving mechanism. The driving mechanism includes a plurality of sprockets that are disposed in series and that rotate coaxially with and together with the carriers, an endless chain wound onto the sprockets, and a chain guide disposed adjacent to the chain so as to sandwich the chain from the outside of the outer periphery thereof.

According to this structure, even if the chain is elongated by, for example, a load imposed on the carriers as a result of allowing the conveyor to repeatedly perform the conveying operation, the chain guide disposed adjacent to the outside of the chain restricts an inaccurate engagement of the chain (i.e., a shake or a slack in a direction perpendicular to the direction in which the chain is stretched), and prevents the chain from being disengaged from the sprockets.

Therefore, since the chain is accurately engaged with each of the sprockets on both sides, i.e., on the tension and slack sides in particular, in a structure in which three or more sprockets are disposed, the chain is successively sent (pulled) by the sprockets, i.e., from the sprocket disposed at one end to the sprocket disposed at the other end through the sprockets disposed at the middle. Accordingly, the slack of the chain between the sprockets is absorbed, and a driving force is reliably transmitted.

As a result, there is no need to adjust the stretch of the chain, and the chain can be prevented from slipping off. Therefore, the structure can be made simpler, and costs can be made smaller than a case in which, for example, an adjusting mechanism for exclusive use is provided.

The conveyor apparatus formed as above can employ a structure in which the carriers and the sprockets are disposed so as to rotate around an axial line extending substantially horizontally, and the chain guide is disposed so as to sandwich the chain from the outside in upward and downward directions.

According to this structure, even if the chain is elongated because of a time-dependent change and is loosened vertically in accordance with this elongation in a state in which the chain is wound onto the sprockets in a vertical plane so as to convey objects to be conveyed horizontally, the chain guide disposed adjacent to the lower side of the chain and the chain guide disposed adjacent to the upper side of the chain restrict a downward slack of the chain and restrict an upward movement resulting from a shake in a direction perpendicular to the direction in which the chain is stretched, so that the chain can be prevented from being disengaged from the sprockets. As a result, on the upper and lower sides, i.e., on the tension and slack sides, the slack of the chain between the sprockets is absorbed, and the driving force is reliably transmitted in the same way as above.

The conveyor formed as above can employ a structure in which the chain guide is made of a softer material than the chain.

According to this structure, even if the chain slides on the chain guide in the state of having been elongated, the chain is constrained or prevented from wearing down, and hence a desired function can be guaranteed, and the conveyor apparatus can stably convey the to-be-conveyed objects.

The conveyor apparatus formed as above can employ a structure in which the chain guide is detachably attached to a frame supporting the carriers.

According to this structure, if the chain slides and, as a result, the chain guide wears down beyond a predetermined level although such a situation does not often arise, the chain guide can be detached from the frame and be easily exchanged for a new one.

DETAILED DESCRIPTION OF THE INVENTION

Embodiments of the present invention will be hereinafter described with reference to the accompanying drawings.

Figure 1:
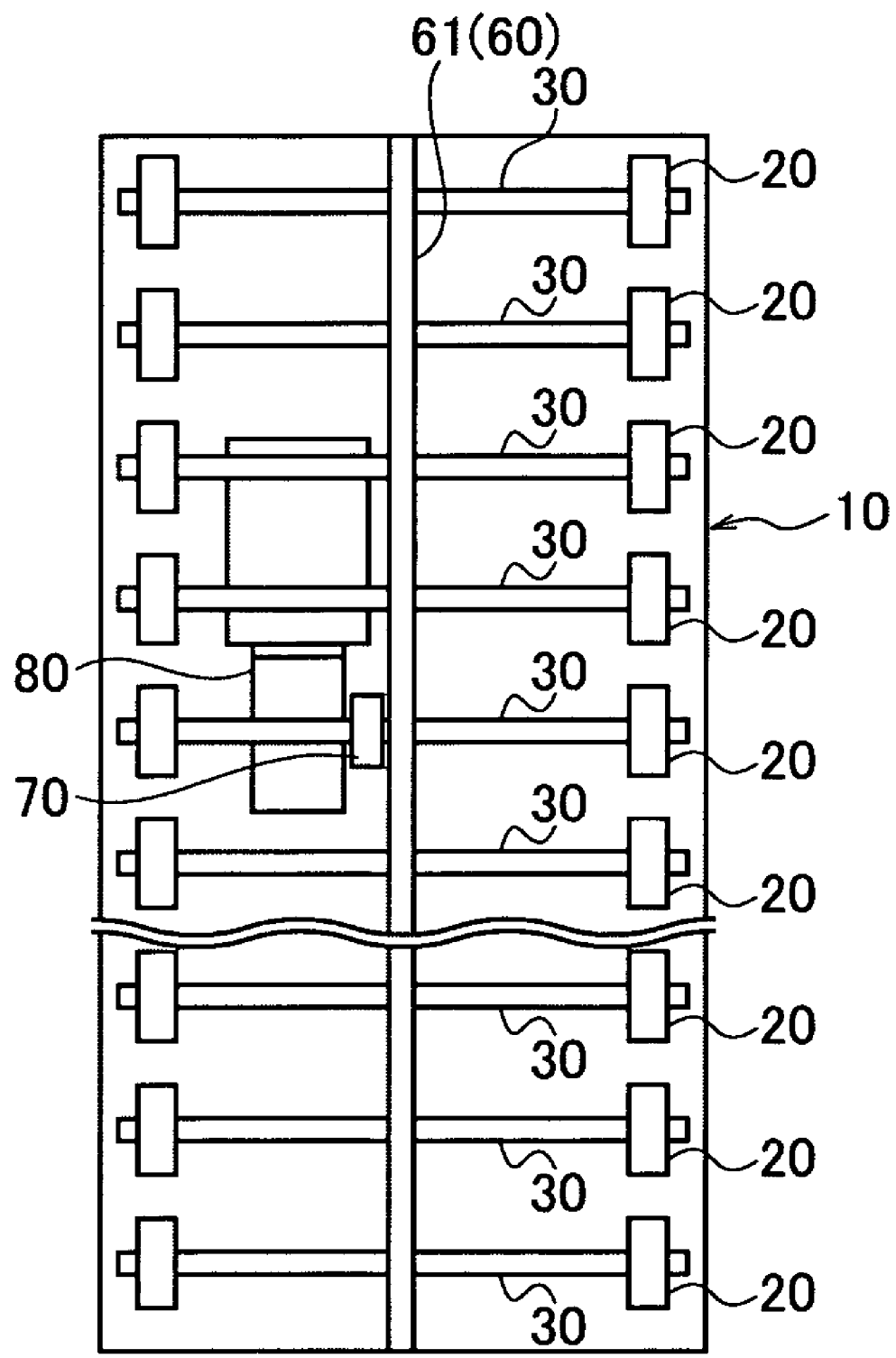
FIG. 1 is a plan view showing an embodiment of a conveyor apparatus including a chain-driving mechanism according to the present invention.
Figure 2:
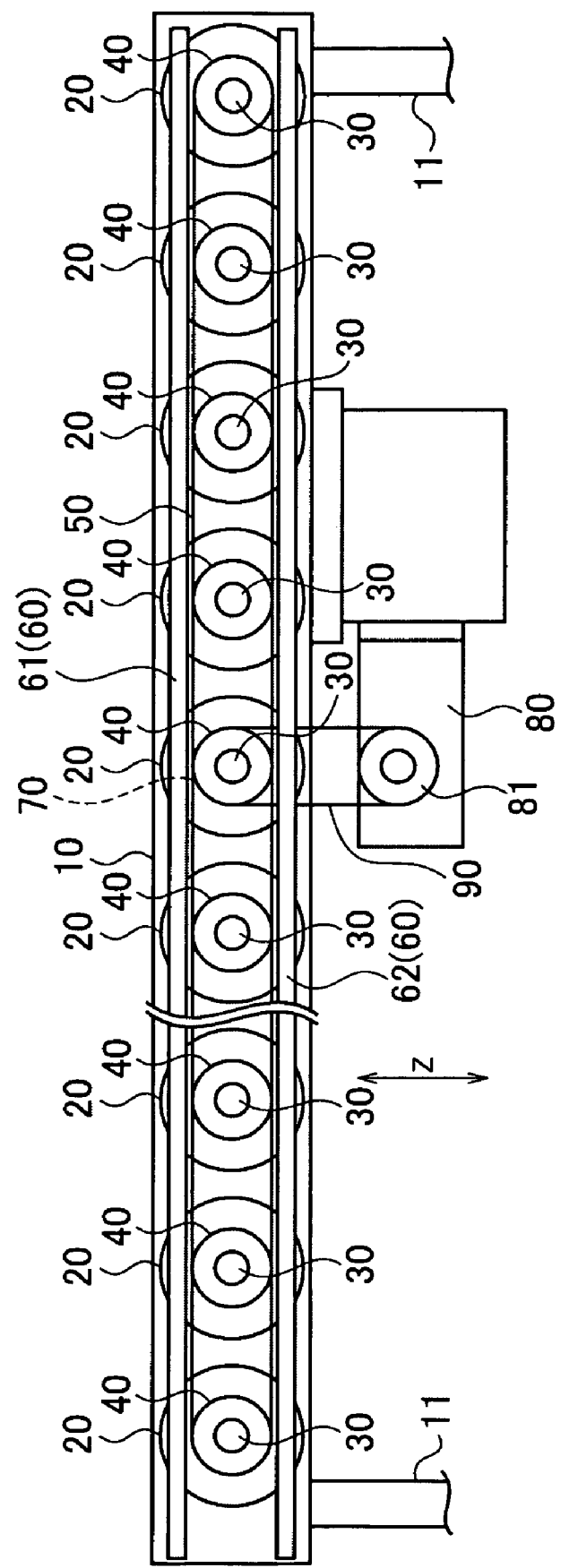
FIG. 2 is a sectional side view of the conveyor apparatus of FIG. 1.

As shown in FIG. 1 and FIG. 2, this conveyor apparatus includes a frame 10 long in one direction, a plurality of rollers 20 serving as carriers rotatably arranged on the frame 10, a plurality of shafts 30 that have their axial lines directed horizontally and that are arranged to support the rollers 20, a plurality of sprockets 40 attached to substantially middle positions of the shafts 30 so as to rotate together therewith, an endless chain 50 wound onto the sprockets 40, a chain guide 60 (61, 62) disposed outside the chain 50 in upward and downward directions Z so as to be adjacent to the chain 50, a driven sprocket 70 disposed adjacent to one of the sprockets 40, a motor 80 serving as a driving source disposed under the frame 10, and a chain 90 wound onto a driving sprocket 81 of the motor 80 and the driven sprocket 70.

As shown in FIG. 1 and FIG. 2, the frame 10 is long in a direction in which to-be-conveyed objects are conveyed in the horizontal direction, and rotatably supports the shafts 30 supporting the rollers 20 serving as carriers. The frame 10 additionally has legs 11, and is disposed in a conveying line of, for example, plant facilities.

Each of the rollers 20 is a friction roller formed so that its inner part connected directly to the shaft 30 and its outer part being in contact with to-be-conveyed objects can rotate together by means of a frictional force. Therefore, when the to-be-conveyed objects are smoothly conveyed, and the load imposed on the roller 20 is below a predetermined level, the roller 20 rotates together with the shaft 30. On the other hand, when the load imposed thereon exceeds the predetermined level, the roller 20 stops rotating, so that the shaft 30 runs idle.

The shafts 30 are disposed to have a predetermined pitch (arrangement interval) L therebetween, which is described later. Each of the sprockets 40 is attached to a substantially middle part of the shaft 30 in its axial direction so as to rotate together with the shaft 30. The driven sprocket 70 is firmly attached to one of the shafts 30 near the sprocket 40 so as to rotate with the shaft 30. The endless chain 90 stretched in upward and downward directions is wound onto the driven sprocket 70 and onto the driving sprocket 81 so that the driving force of the motor 80 can be transmitted.

The sprockets 40 are all the same, and are arranged in series so as to be aligned in the conveying direction. Each of the sprockets 40 is firmly attached to a respective end of the shafts 30, and rotates around an axial line (i.e., axial line of the shaft 30) that extends substantially horizontally.

The sprocket 40 is appropriately selected from standard products in relation to the chain 50, and meets conditions, such as a predetermined number of teeth Z, a predetermined pitch diameter Dp, a predetermined outer diameter D, and a predetermined material.

In this embodiment, for example, a sprocket whose number of teeth Z is 13, whose pitch diameter Dp is 66.34 mm, whose outer diameter D is 73 mm, and whose material is machine structural carbon steel is selected as a preferable sprocket 40 with respect to the chain 50 whose pitch P is 15.875 mm.

Figure 3:
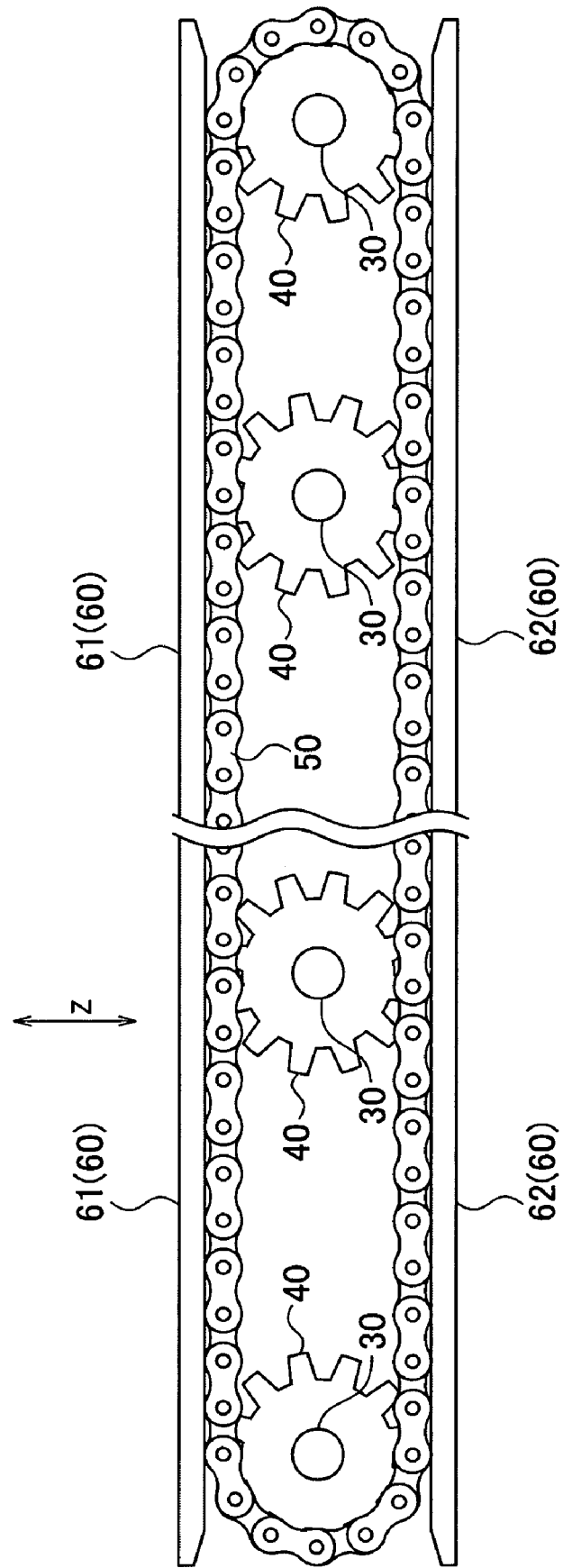
FIG. 3 is a side view showing the relationship between a chain, sprockets, and a chain guide and depicting a state in which the chain has not been elongated.

As shown in FIG. 2 and FIG. 3, the endless chain 50 is wound onto the sprockets 40 so as to engage with each of the sprockets 40 disposed at both ends around substantially half the circumference of the sprocket 40 and so as to engage with each of the other sprockets 40 disposed in a middle area between the two sprockets 40 disposed at both ends in an upper area and in a lower area of the other sprockets 40. The chain 50 is appropriately selected from predetermined standard products, and meets conditions, such as a predetermined pitch P, a predetermined number of links, a predetermined elongation rate (e.g., within three percent), and a predetermined material having excellent abrasion resistance, in relation to the sprocket 40, the pitch (arrangement interval) L of the shaft 30, etc. In this embodiment, the chain 50 is made of a relatively hard material, such as machine structural alloy steel (e.g., SCM 440).

The chain guide 60 is made of a softer material, such as rolled steel for ordinary machine construction (e.g., SS400), than that of the chain 50. As shown in FIG. 2 and FIG. 3, the chain guide 60 is disposed adjacent to the chain 50 (i.e., being in contact with the chain 50 or having a slight gap between the chain guide 60 and the chain 50) in such a way as to sandwich the chain 50 from the outside of its outer periphery (i.e., from the outside in the upward and downward directions Z) in a direction in which the chain 50 is stretched.

In other words, the chain guide 60 consists of an upper chain guide 61 adjacent to the upper part of the chain 50 and a lower chain guide 62 adjacent to the lower part of the chain 50 as shown in FIG. 2 and FIG. 3.

Figure 4:
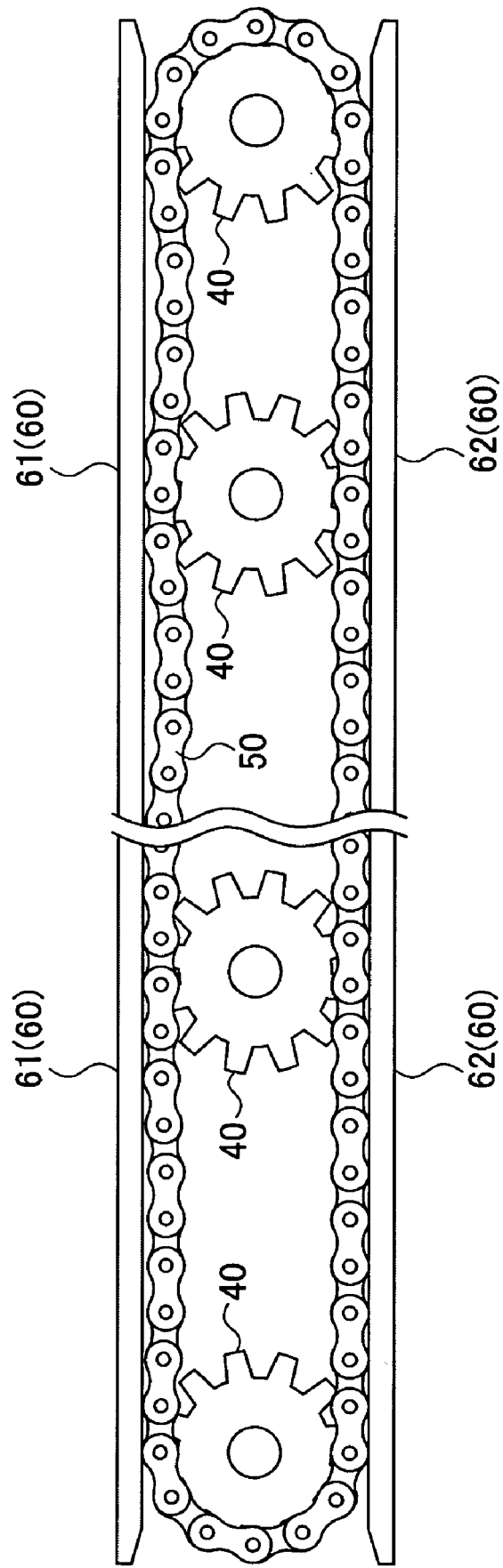
FIG. 4 is a side view showing the relationship between the chain, the sprockets, and the chain guide and depicting a state in which the chain has been elongated.

The upper chain guide 61 is detachably attached to the frame 10. When the chain 50 is brought into an elongated state resulting from, for example, a time-dependent change as shown in FIG. 4, and, as a result, the chain 50 shakes or trembles in a direction perpendicular to the moving direction (i.e., in the upward and downward directions Z), the upper chain guide 61 restricts the shaking of the chain 50 and prevents the chain 50 from being disengaged from the sprockets 40.

The lower chain guide 62 is detachably attached to the frame 10. When the chain 50 is brought into an elongated state resulting from, for example, a time-dependent change and is loosened downward, the lower chain guide 62 restricts the downward looseness of the chain 50 and prevents the chain 50 from being disengaged from the sprockets 40 as shown in FIG. 4.

The chain 50 is maintained to be accurately engaged with the sprockets 40, in particular, the sprockets 40 disposed at the middle, by the operation of these chain guides 60 (61, 62). Accordingly, on the upper and lower sides, i.e., on the tension and slack sides, the looseness of the chain 50 caused between the sprockets 40 is absorbed by the sprockets 40 successively sending (pulling) the chain 50. As a result, even if a driving force is given to one of the sprockets 40 (one of the shafts 30) disposed at places other than both ends, the driving force can be reliably transmitted to the other sprockets 40, and the rollers 20 can convey the to-be-conveyed objects while individually rotating.

Additionally, since the chain guide 60 (61, 62) is made of a softer material than that of the chain 50, the chain 50 is constrained or prevented from wearing down even if the chain 50 comes into contact with the chain guide 60 and slides thereon, and the transmitting operation can be stably provided without impairing the proper function inherent in the chain 50.

In case the chain guide 60 (61, 62) wears down beyond an allowable limit although such a situation does not often arise, the chain guide 60 (61, 62) can be detached from the frame 10 and be easily exchanged for a new one.

Figure 5A:
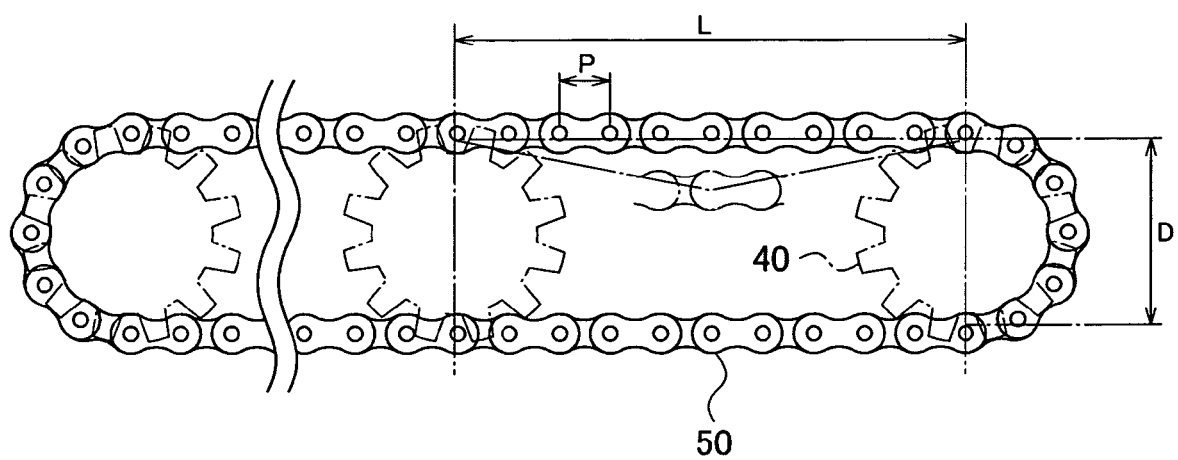
FIG. 5A and FIG. 5B are schematic views for explaining the pitch of the sprocket and the elongation of the chain.

Referring now to FIG. 5A, a description will be given of the pitch L employed when the shafts 30, i.e., the sprockets 40 are arranged with predetermined intervals, in consideration of the elongation of the chain 50.

To arrange the sprockets 40, the pitch L is required to be greater than at least the outer diameter D of the sprocket 40, and is set to satisfy the following relation (1)

$$P \times N = 2L \tag{1}$$

where P is the pitch of the chain 50, and N is a condition establishment variable (multiple of 0.5).

Herein, the sprocket 40 whose number of teeth Z is 13, whose pitch diameter Dp is 66.34 mm, and whose outer diameter D is 73 mm is applied, and the chain 50 whose pitch P is 15.875 mm is applied. In this case, preferably, the pitch L of the sprocket 40 has a value below 120 mm and near 120 mm.

Therefore, let the pitch L be 120 mm.

When this value is substituted for relation (1), $$15.875 \times N = 2 \times 120$$

that is, $$N = 240/15.875 = 15.118$$

Herein, since N must be a multiple of 0.5, the actual value of the condition establishment variable N is 15 (N=15).

Therefore, when the actual pitch L is calculated by substituting N=15 for relation (1), $$15.875 \times 15 = 2L$$

that is, $$L = 15.875 \times 15/2 = 238.125/2 = 119.0625$$

Therefore, preferably, the actual pitch L is 119.0625 mm.

On the other hand, the minimum pitch is 75.40625 mm on the assumption that the minimum pitch is greater than the outer diameter D (73 mm) of the sprocket 40. The maximum pitch is appropriately set in accordance with the to-be-conveyed objects. If the amount of slack of the chain 50 is greater than an allowance, the sprockets 40 are increased in number, and the pitch L is made smaller.

Preferably, the amount d of slack of the chain 50 where no defect occurs is, for example, 20 mm or less.

Figure 5B:
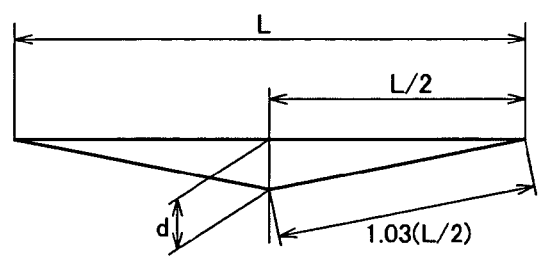

Therefore, the pitch L of the sprocket 40 calculated with reference to FIG. 5B on the assumption that the amount d of slack of the chain 50 is 20 mm, the pitch diameter Dp of the sprocket 40 is 66.34 mm, and the maximum elongation rate of the chain 50 is 3 percent in the specifications mentioned above can be expressed as follows:

$$[1.03(L/2)]^2 = d^2 + (L/2)^2$$

that is,

L=162.09 mm.

Therefore, the pitch L that allows the amount d of slack reaching the value of 20 mm is 162.09 mm or less.

On the other hand, the amount d of slack of the chain 50 when L is 119.0625 mm can be expressed as follows:

$$[1.03(119.0625/2)]^2 = d^2 + (119.0625/2)^2$$

that is, d=10.31 mm.

Therefore, when the pitch L is 119.0625 mm, the amount d of slack of the chain 50 becomes equal to 10.31 mm, which is smaller than the allowable limit of 20 mm. Therefore, no adjustment is needed.

In other words, the slack of the chain 50 can be restricted, and the chain 50 can be reliably prevented from being disengaged from the sprockets 40 without performing an adjustment by employing the chain guide 60 (61, 62) on the condition that the pitch L of the sprocket 40 is 119.0625 mm.

In particular, since the chain guide 60 is simple in structure, the structure of the apparatus can be made simpler, and costs can be made smaller than a case in which, for example, a tension adjusting mechanism for exclusive use is provided.

Figure 6:
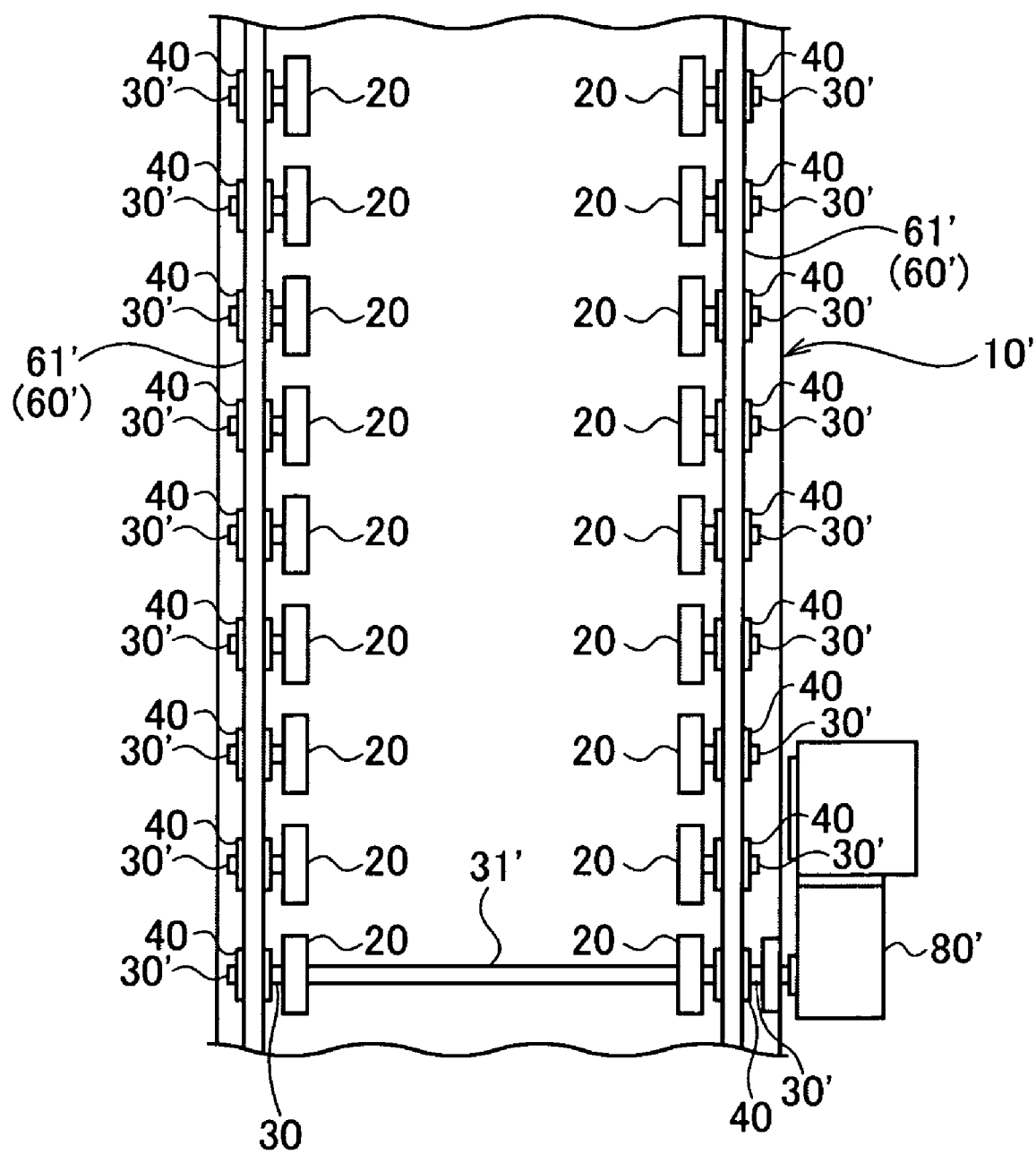
FIG. 6 is a plan view showing another embodiment of the conveyor apparatus including the chain-driving mechanism according to the present invention.
Figure 7:
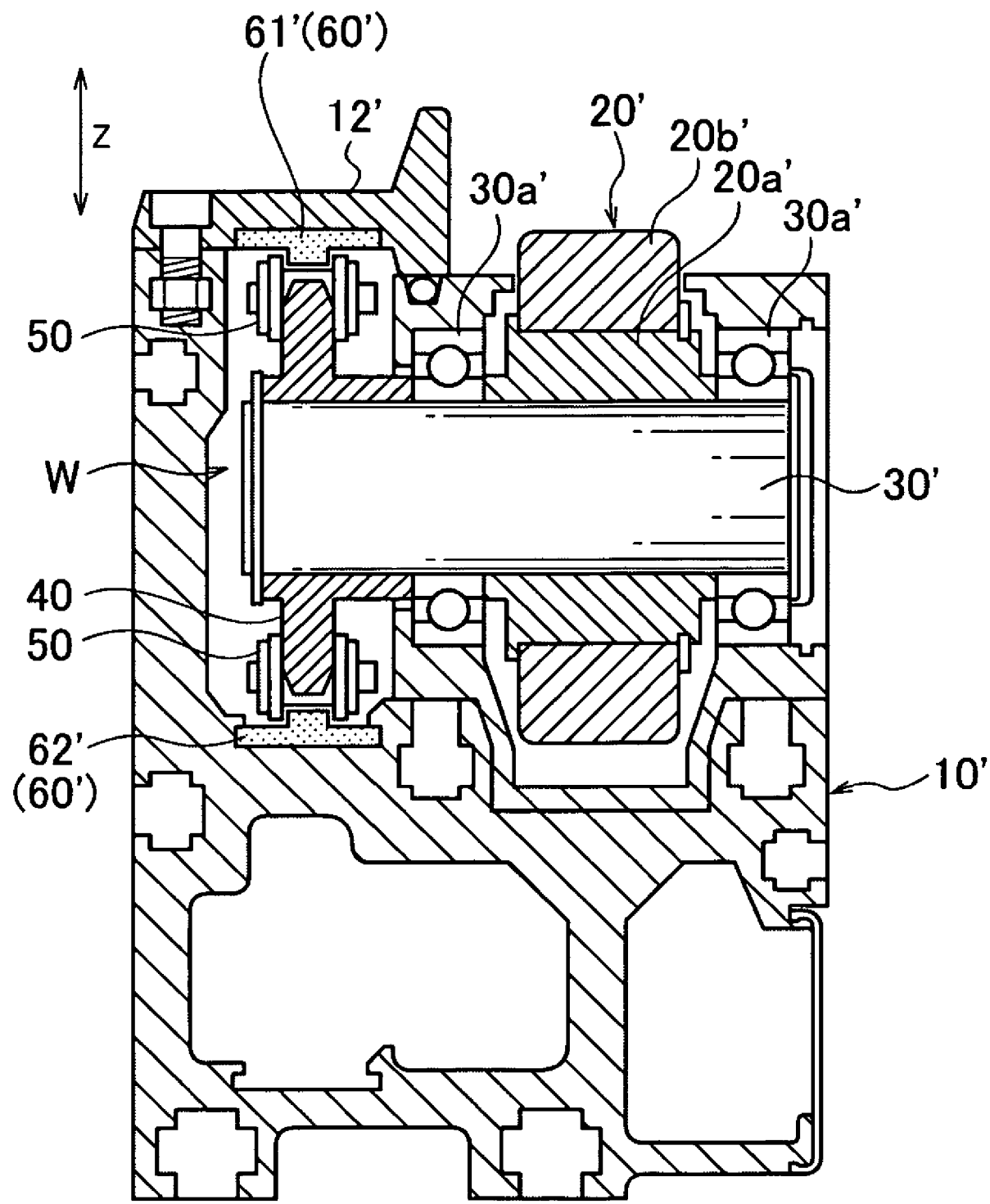
FIG. 7 is a sectional view showing a part of the conveyor apparatus of FIG. 6.

FIG. 6 and FIG. 7 show another embodiment of the conveyor apparatus including the chain-driving mechanism according to the present invention. In FIG. 6, some constituent elements are omitted. In this embodiment, the same reference characters as in the foregoing embodiment are given to the same structures, and descriptions thereof are omitted.

As shown in FIG. 6 and FIG. 7, this conveyor apparatus includes a frame 10', a plurality of rollers 20' serving as carriers rotatably disposed on both sides of the frame 10', a plurality of shafts 30' each of which has its axial line horizontally directed to support the rollers 20', a plurality of sprockets 40 each of which is firmly attached to the outer end of each of the shafts 30' so as to rotate together, an endless chain 50 wound onto the sprockets 40, a chain guide 60' (61', 62') adjacent to the outside of the chain 50 in upward and downward directions Z, a connection shaft 31' by which a pair of shafts 30' facing each other are connected together, and a motor 80 that is fixed to the side of the frame 10' and that is connected directly to one of the shafts 30' so as to serve as a driving source that gives a driving force.

As shown in FIG. 6, the frame 10' is long in a direction in which to-be-conveyed objects are conveyed in the horizontal direction, and, as shown in FIG. 7, rotatably supports the shaft 30' on a bearing 30a'. A space W used to dispose the sprockets 40 in series is formed at both outsides of the frame 10'. A cover 12' that covers the space W is provided thereover.

As in the foregoing embodiment, each of the rollers 20' is a friction roller formed so that its inner part 20a' firmly attached to the shaft 30' and its outerpart 20b' being in contact with the to-be-conveyed objects can rotate together by means of a frictional force.

As in the foregoing embodiment, the shafts 30' are disposed to have a predetermined pitch L therebetween, and each of the sprockets 40 is attached to the outer end of a respective end of the shafts 30' so as to rotate together. The sprockets 40 are aligned in series in the conveying direction so as to turn together with the shafts 30'.

The chain guide 60' is made of a softer material, such as rolled steel for ordinary machine construction (e.g., SS400), than that of the chain 50. As shown in FIG. 7, the chain guide 60' is disposed adjacent to the chain 50 (i.e., being in contact with the chain 50 or having a slight gap between the chain guide 60' and the chain 50) in such a way as to sandwich the chain 50 from the outside in the upward and downward directions Z. In other words, the chain guide 60' consists of an upper chain guide 61' adjacent to the upper part of the chain 50 and a lower chain guide 62' adjacent to the lower part of the chain 50 as shown in FIG. 7.

The upper chain guide 61' is detachably attached to the cover 12' fixed to the frame 10'. When the chain 50 is brought into an elongated state resulting from, for example, a time-dependent change as shown in FIG. 4, and, as a result, the chain 50 shakes or trembles in a direction perpendicular to the moving direction (i.e., in the upward and downward directions Z), the upper chain guide 61' restricts the shaking of the chain 50 and prevents the chain 50 from being disengaged from the sprockets 40.

The lower chain guide 62' is detachably attached to a part of the frame 10'. When the chain 50 is brought into an elongated state resulting from, for example, a time-dependent change and is loosened downward, the lower chain guide 62' restricts the downward looseness of the chain 50 and prevents the chain 50 from being disengaged from the sprockets 40 as shown in FIG. 4.

The chain 50 is maintained to be accurately engaged with the sprockets 40, in particular, the sprockets 40 disposed at the middle, by the operation of these chain guides 60' (61', 62'). Accordingly, on the upper and lower sides, i.e., on the tension and slack sides, the looseness of the chain 50 caused between the sprockets 40 is absorbed by the sprockets 40 successively sending (pulling) the chain 50. As a result, even if a driving force is given to one of the sprockets 40 (one of the shafts 30') disposed at places other than both ends, the driving force can be reliably transmitted to the other sprockets 40, and the rollers 20' can convey the to-be-conveyed objects while individually rotating.

Additionally, since the chain guide 60' (61', 62') is made of a softer material than that of the chain 50, the chain 50 is constrained or prevented from wearing down even if the chain 50 comes into contact with the chain guide 60' and slides thereon, and the transmitting operation can be stably provided without impairing the proper function inherent in the chain 50.

If the chain guide 60' (61', 62') wears down beyond an allowable limit although such a situation does not often arise, the chain guide 60' (61', 62') can be detached from the frame 10' and be easily exchanged for a new one.

Figure 8:
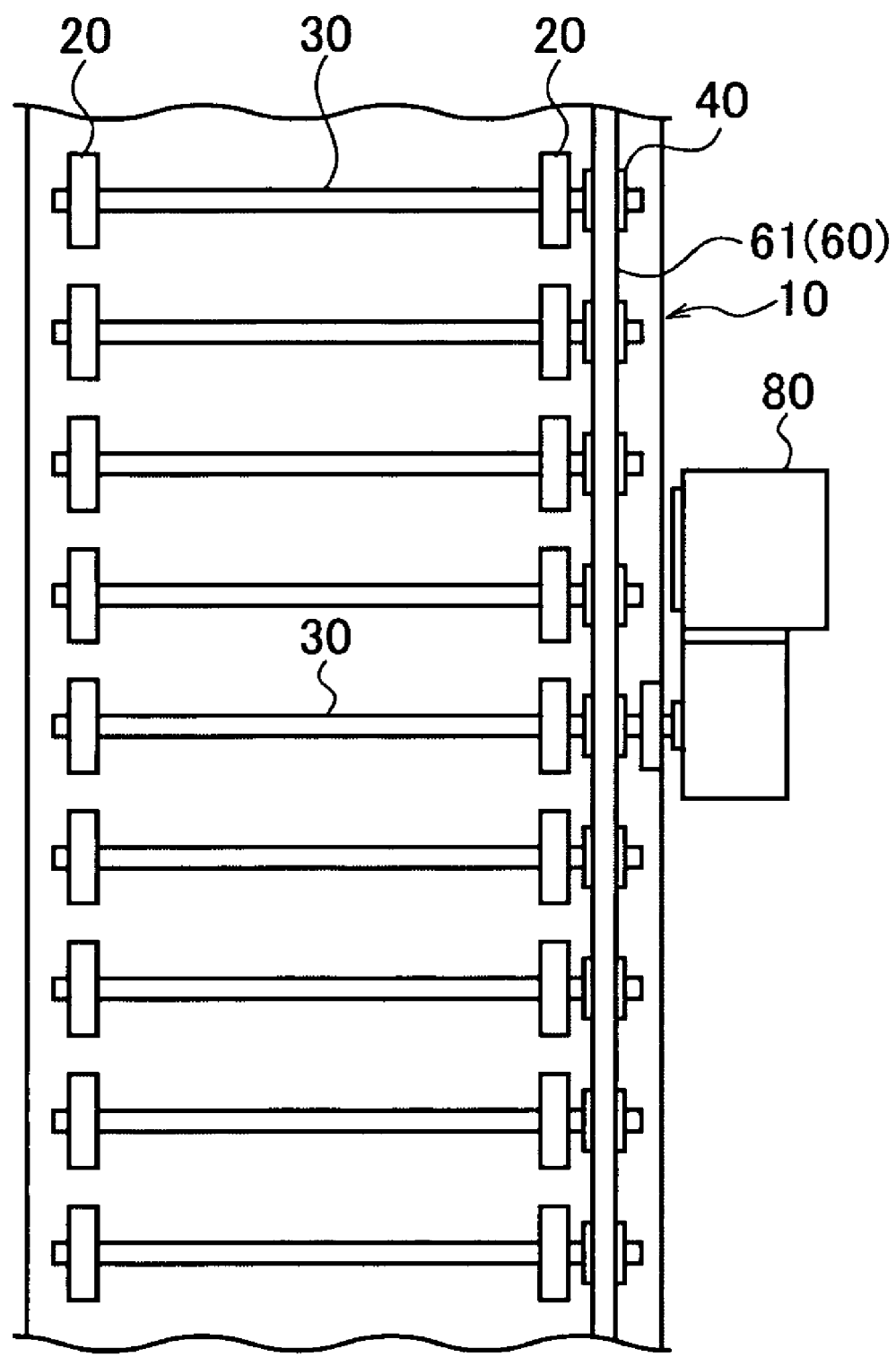
FIG. 8 is a plan view showing still another embodiment of the conveyor apparatus including the chain-driving mechanism according to the present invention.
Figure 9:
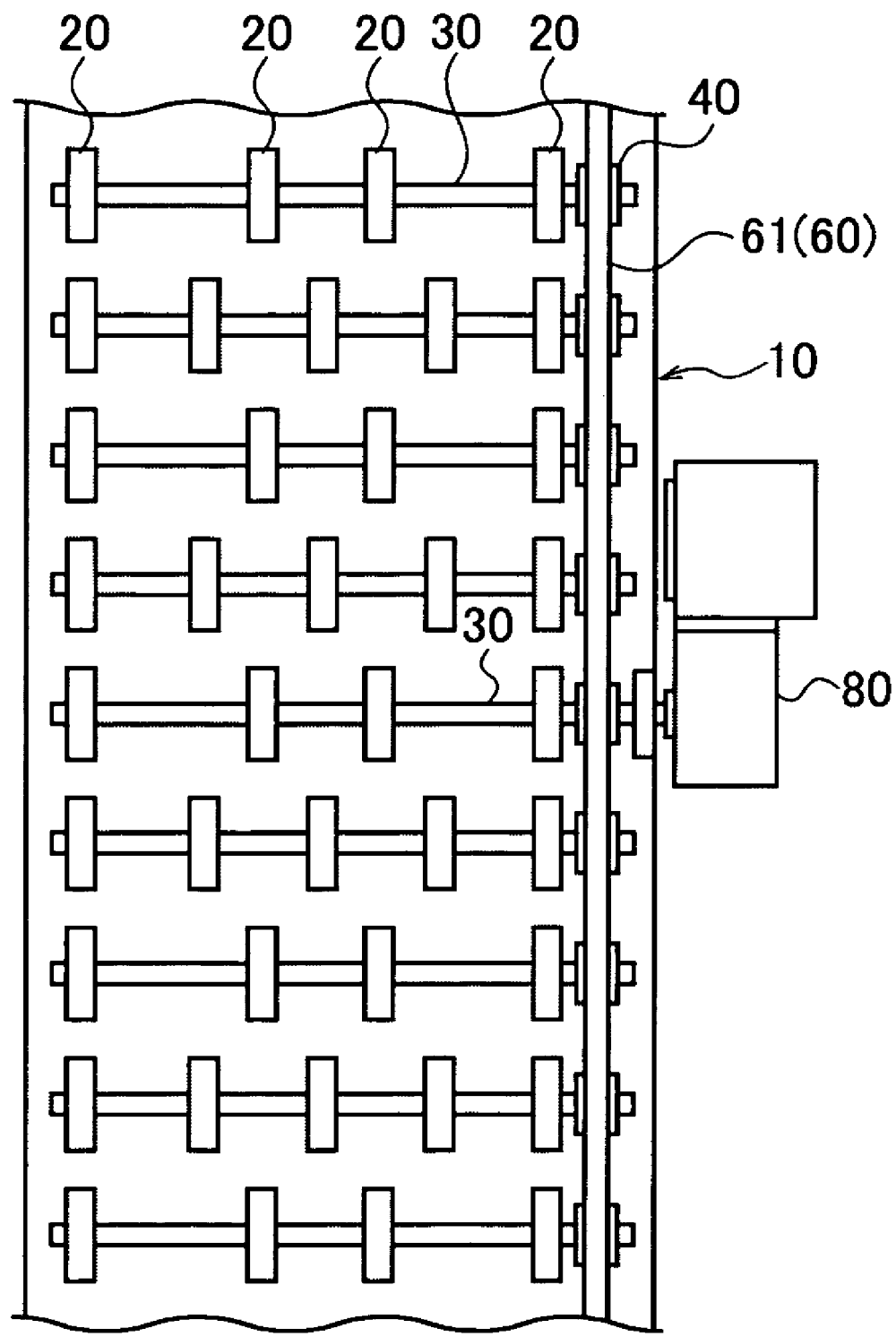
FIG. 9 is a plan view showing still another embodiment of the conveyor apparatus including the chain-driving mechanism according to the present invention.
Figure 10:
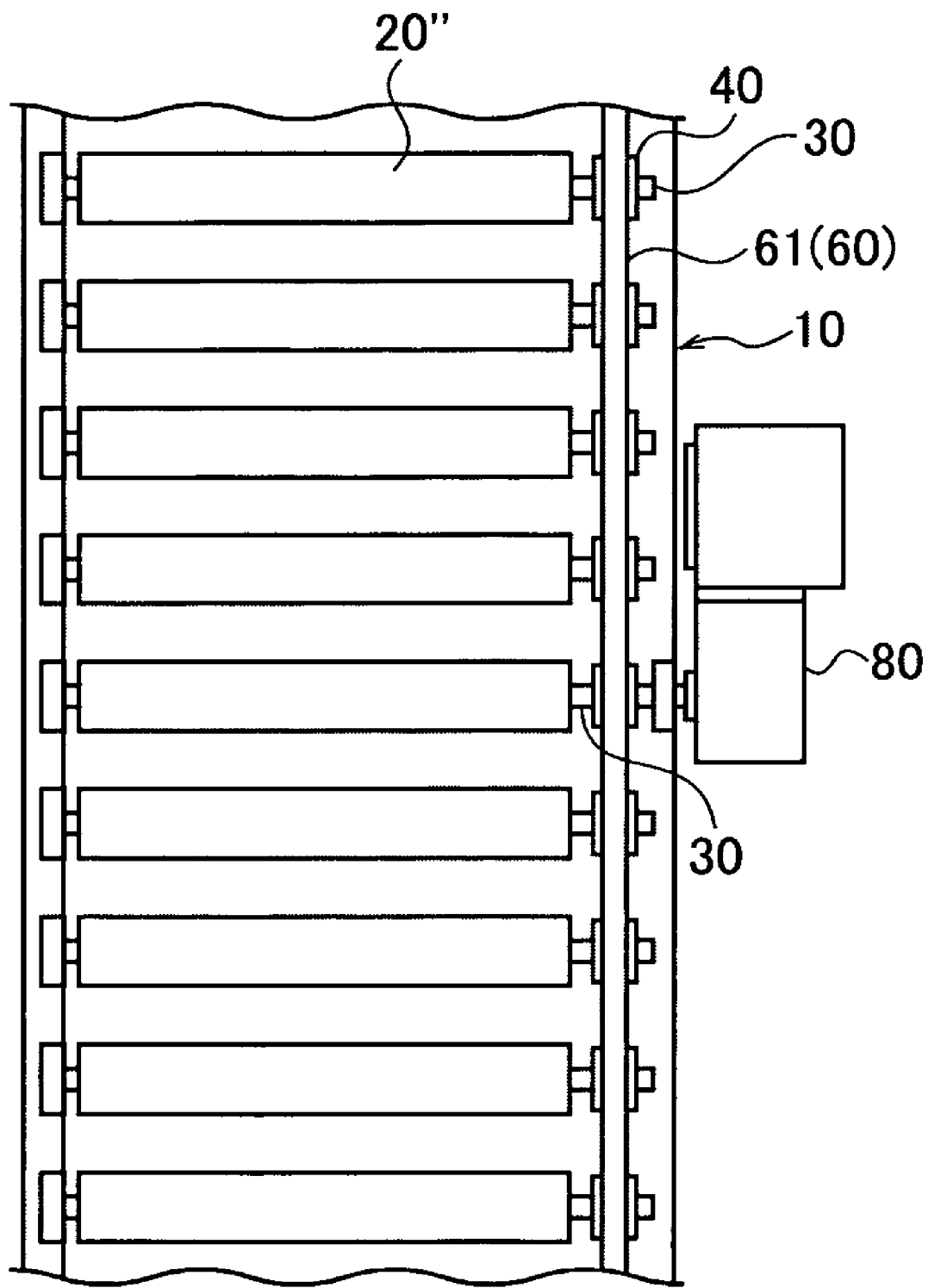
FIG. 10 is a plan view showing still another embodiment of the conveyor apparatus including the chain-driving mechanism according to the present invention.

FIG. 8 to FIG. 10 show still another embodiment of the conveyor apparatus including the chain-driving mechanism according to the present invention. In this embodiment, the same reference characters as in the foregoing embodiments are given to the same structures, and descriptions thereof are omitted.

Unlike the apparatus of FIG. 1, the apparatus of FIG. 8 has a structure in which the sprockets 40, the chain 50, and the chain guide 60 (61, 62) are disposed not at the middle but at the right end, and the motor 80 is connected directly to one of the shafts 30.

As in the foregoing embodiments, in this apparatus, the chain 50 is maintained to be accurately engaged with the sprockets 40 by means of the chain guide 60 (61, 62) disposed adjacent to the outside in the upward and downward directions of the chain 50. Therefore, there is no need to adjust the slack of the chain 50. Additionally, even if a driving force is given to one of the shafts 30 (one of the sprockets 40) from the motor 80, the driving force can be reliably transmitted to the other sprockets 40, and the rollers 20 can convey the to-be-conveyed objects while individually rotating.

The apparatus of FIG. 9 is different from the apparatus of FIG. 8 in the fact that the number of the rollers 20 coaxially supported by the shafts 30 is further increased.

Likewise, in this apparatus, the chain 50 is maintained to be accurately engaged with the sprockets 40 by means of the chain guide 60 (61, 62) disposed adjacent to the outside in the upward and downward directions of the chain 50. Therefore, there is no need to adjust the slack of the chain 50. Additionally, even if a driving force is given to one of the shafts 30 (one of the sprockets 40) from the motor 80, the driving force can be reliably transmitted to the other sprockets 40, and the rollers 20 can convey the to-be-conveyed objects while individually rotating.

The apparatus of FIG. 10 is different from the apparatus of FIG. 8 in the fact that the type of the roller to be connected to the shaft 30 has been changed. That is, a cylindrical roller 20" extending in the axial direction is supported by the shaft 30.

Likewise, in this apparatus, the chain 50 is maintained to be accurately engaged with the sprockets 40 by means of the chain guide 60 (61, 62) disposed adjacent to the outside in the upward and downward directions of the chain 50. Therefore, there is no need to adjust the slack of the chain 50. Additionally, even if a driving force is given to one of the shafts 30 (one of the sprockets 40) from the motor 80, the driving force can be reliably transmitted to the other sprockets 40, and the rollers 20" can convey the to-be-conveyed objects while individually rotating.

Figure 11A:
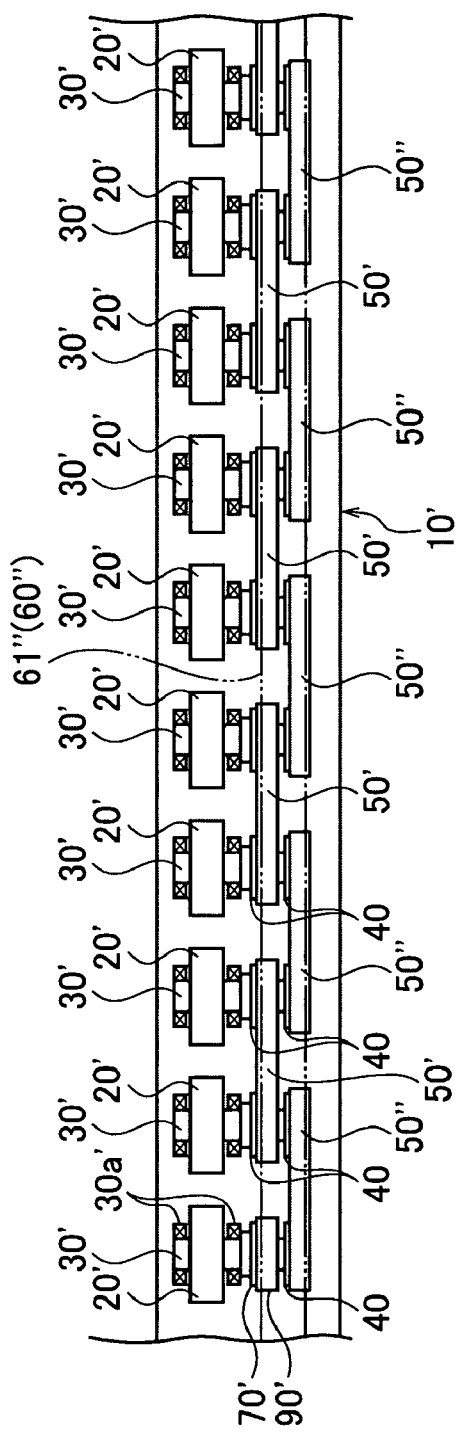
FIG. 11A is a plan view showing still another embodiment of the conveyor apparatus including the chain-driving mechanism according to the present invention.
Figure 11B:
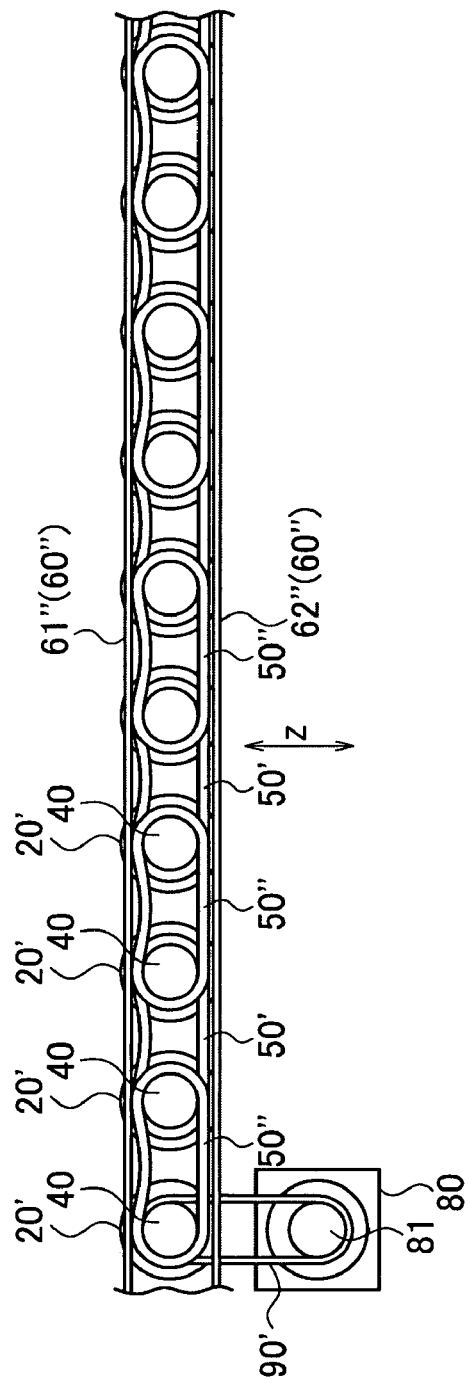
FIG. 11B is a side view showing the embodiment of FIG. 11A of the conveyor apparatus including the chain-driving mechanism according to the present invention.

FIG. 11A and FIG. 11B show still another embodiment of the conveyor apparatus including the chain-driving mechanism according to the present invention. In this embodiment, the same reference characters as in FIG. 6 and FIG. 7 are given to the same structures, and descriptions thereof are omitted.

As shown in FIG. 11A, in this apparatus, two sprockets 40 are firmly attached coaxially and integrally with each shaft 301 disposed on both sides of the frame 10'. A chain 501 is wound onto adjoining inner sprockets 40, and a chain 50" is wound onto adjoining outer sprockets 40 in a state of being displaced by one sprocket with respect to the inner sprockets 40.

One of the sprockets of one of the shafts 30' is a driven sprocket 70'. A driving chain 90' is wound onto the driven sprocket 70' and onto a driving sprocket 81 of the motor 80 disposed thereunder.

The chains 50' and 50" are wound on to two adjoining sprockets 40, and are set to have a predetermined length shorter than the chain 50 mentioned above in accordance with the pitch L of the sprocket 40.

The chain guide 6011 is made of a softer material, such as rolled steel for ordinary machine construction (e.g., SS400), than that of the chain 50' or 50". As shown in FIG. 11B, the chain guide 60" is disposed adjacent to the chains 50' and 50" (i.e., being in contact with the chains 50' and 50" or having a slight gap between the chain guide 60" and the chain 50' or 50") in such a way as to sandwich the chain 50' from the outside in the upward and downward directions Z.

In other words, the chain guide 60" consists of an upper chain guide 61" adjacent to the upper part of the chain 50' or 50" and a lower chain guide 62" adjacent to the lower part of the chain 50' or 50" as shown in FIG. 11B.

In this embodiment, although only the shaft 30', the roller 20', the sprocket 40, the chains 50' and 50", and the chain guide 60" that are disposed on one side with respect to the frame 10' are shown, a driving force is transmitted via one connection shaft 31' to the shaft 30', the roller 20', the sprocket 40, and the chains 50' and 50" that are disposed on the other side.

Likewise, in this apparatus, the chains 50' and 50" are maintained to be accurately engaged with the sprockets 40 by means of the chain guide 60" (61", 62") disposed adjacent to the outside in the upward and downward directions of the chains 50' and 50". Therefore, there is no need to adjust the slack of the chains 50' and 50". Additionally, even if a driving force is given to one of the shafts 30' (one of the sprockets 40) from the motor 80, the driving force can be reliably transmitted to the other sprockets 40, and the rollers 20' can convey the to-be-conveyed objects while individually rotating.

In the foregoing embodiments, a structure is shown in which the sprockets 40 are disposed so as to rotate around the axial line (i.e., the shafts 30 and 30' disposed horizontally) extending substantially horizontally and in which the chain guides 60, 60', and 60" are disposed so as to sandwich the chains 50, 50', and 50" from the outside in the upward and downward directions Z. However, without being limited to this, the present invention may employ a structure in which the sprockets 40 are disposed so as to rotate around an axial line extending slantingly or in substantially upward and downward directions and in which the chain guide is disposed so as to sandwich the chain from the outside in a direction perpendicular to the axial line.

In the foregoing embodiments, an example is shown in which a driving force is given to the sprockets 40 disposed at the middle. However, without being limited to this, the present invention may employ a chain guide in a structure in which a driving force is given to a sprocket disposed at an end that is engaged with the chain 50 around substantially half the circumference thereof, or, alternatively, may employ a method in which the rotational direction of a sprocket to which a driving force is given exerts a tension onto the lower side of a chain and a slack onto the upper side of the chain, or, alternatively, may employ a method in which the rotational direction of a sprocket to which a driving force is given exerts a tension onto the upper side of a chain and a slack onto the lower side of the chain.

In the foregoing embodiments, an example is shown in which the sprockets 40 used therein are all the same (in the number Z of teeth, in the pitch diameter Dp, and in the outer diameter D). However, without being limited to this, the present invention may employ a chain guide in a structure in which sprockets that become progressively greater in pitch diameter Dp, outer diameter D, etc., from one end to the other end or from both ends to the center are disposed and in which an endless chain is wound onto these sprockets.

As described above, according to the chain-driving mechanism and the conveyor apparatus of the present invention, the chain guide is disposed adjacent to the endless chain wound onto the sprockets disposed in series in such a way as to sandwich the chain from the outside of the outer periphery thereof, and hence, even if the chain is elongated resulting from a time-dependent change, the chain guide restricts an inaccurate engagement of the chain (i.e., a shake or a slack in a direction perpendicular to the direction in which the chain is stretched), and prevents the chain from being disengaged from the sprockets. As a result, there is no need to adjust the stretch of the chain, and the chain can be prevented from slipping off. Therefore, the structure can be made simpler, and costs can be made smaller than a case in which, for example, an adjusting mechanism for exclusive use is provided.

INDUSTRIAL APPLICABILITY

As described above, the chain-driving mechanism and the conveyor apparatus of the present invention have no need to adjust the stretch of the chain, and hence are useful for, of course, a machine-related or electricity-related production line in which components are continuously conveyed and for other physical distribution systems that have a need to convey to-be-conveyed objects.

The invention claimed is:

1. A chain-driving mechanism comprising:
a plurality of sprockets disposed in series;
an endless chain wound onto the plurality of sprockets in order to transmit a driving force given to at least one of the plurality of sprockets to the remaining sprockets and drive the remaining sprockets; and
a chain guide disposed adjacent to said chain so as to sandwich said chain from an outside of an outer periphery thereof;
wherein said sprockets are arranged so as to satisfy a following relation (1)

$$P \times N = 2L \tag{1}$$

where L is a pitch of said sprockets, P is a pitch of said chain, and N is a condition establishment variable which is a multiple of 0.5.

2. The chain-driving mechanism as set forth in claim 1, wherein each of said sprockets is disposed so as to rotate around an axial line extending substantially horizontally, and said chain guide is disposed so as to sandwich said chain from above and below.

3. The chain-driving mechanism as set forth in claim 1, wherein said chain guide is made of a softer material than said chain.

4. The chain-driving mechanism as set forth in claim 1, wherein
said plurality of sprockets includes end sprockets that are disposed at both ends of said plurality of sprockets, and at least one middle sprocket that is disposed in a middle area between said end sprockets;
each of said end sprockets engages with said chain around substantially half a circumference thereof; and
said at least one middle sprocket engages with said chain in an upper area and in a lower area thereof.

5. The chain-driving mechanism as set forth in claim 1, wherein said sprockets are arranged such that the pitch L is greater than outer diameters of said sprockets.

6. A conveyor apparatus comprising
a plurality of carriers arranged to convey objects to be conveyed,
a driving mechanism that drives said carriers in conjunction with each other, and
a driving source that exerts a driving force onto said driving mechanism,
wherein said driving mechanism comprises:
a plurality of sprockets that are disposed in series and that rotate coaxially with and together with said carriers;
an endless chain wound onto said plurality of sprockets; and
a chain guide disposed adjacent to said chain so as to sandwich said chain from an outside of an outer periphery thereof;
wherein said sprockets are arranged so as to satisfy a following relation (1)

$$P \times N = 2L \tag{1}$$

where L is a pitch of said sprockets, P is a pitch of said chain, and N is a condition establishment variable which is a multiple of 0.5.

7. The conveyor apparatus as set forth in claim 6, wherein each of said carriers and each of said sprockets is disposed so as to rotate around an axial line extending substantially horizontally, and said chain guide is disposed so as to sandwich said chain from above and below.

8. The conveyor apparatus as set forth in claim 6, wherein said chain guide is made of a softer material than said chain.

9. The conveyor apparatus as set forth in claim 6, further comprising a frame supporting said carriers; and
wherein said chain guide is detachably attached to said frame.

10. The conveyor apparatus as set forth in claim 6, wherein
said plurality of sprockets includes end sprockets that are disposed at both ends of said plurality of sprockets, and at least one middle sprocket that is disposed in a middle area between said end sprockets;
each of said end sprockets engages with said chain around substantially half a circumference thereof; and
said at least one middle sprocket engages with said chain in an upper area and in a lower area thereof.

11. The conveyor apparatus as set forth in claim 6, wherein said sprockets are arranged such that the pitch L is greater than outer diameters of said sprockets.

* * * * *